(12) United States Patent
Morrison

(10) Patent No.: US 6,518,057 B2
(45) Date of Patent: Feb. 11, 2003

(54) COMPOSTING DEVICE

(76) Inventor: Michael Joseph Morrison, 18 Grand Panorama Court, Launching Place, Victoria (AU), 3139

( * ) Notice: Subject to any disclaimer, the term of this patent is extended or adjusted under 35 U.S.C. 154(b) by 0 days.

(21) Appl. No.: 09/747,740

(22) Filed: Dec. 22, 2000

(65) Prior Publication Data

US 2002/0081717 A1 Jun. 27, 2002

(51) Int. Cl.$^7$ ................................................. C12M 1/00
(52) U.S. Cl. .................................. 435/290.1; 435/290.4
(58) Field of Search ............................ 435/290.1, 290.4

(56) References Cited

U.S. PATENT DOCUMENTS

| 4,797,367 A |   | 1/1989 | Pinder |
|---|---|---|---|
| 5,031,796 A |   | 7/1991 | Shafer et al. |
| 5,545,559 A | * | 8/1996 | Kariniemi ................. 435/290.1 |
| 5,565,015 A |   | 10/1996 | Kobayashi |

FOREIGN PATENT DOCUMENTS

| AU | 199963135 A1 | 6/2000 |
|---|---|---|
| DE | 38 02 499 A | 12/1988 |
| DE | 3918650 A1 | 12/1990 |
| DE | 4008104 A1 | 9/1991 |
| DE | 4021868 A1 | 11/1991 |
| DE | 4021865 A1 | 1/1992 |
| DE | 42 05 677 A1 | 8/1993 |
| DE | 42 37 874 A1 | 8/1993 |
| DE | 296 07 998 U1 | 9/1996 |
| DE | 296 19 309 U1 | 2/1997 |
| DE | 19804644 A1 | 8/1999 |
| EP | 394729 A2 | 10/1990 |
| EP | 484 156 A1 | 5/1992 |
| FR | 2 718 435 A1 | 10/1995 |
| GB | 2 276 158 A | 9/1994 |
| JP | 9141234 | 6/1997 |
| JP | 9141235 | 6/1997 |
| JP | 9150133 | 6/1997 |
| JP | 10059791 | 3/1998 |
| JP | 10286545 | 10/1998 |
| WO | WO 91/10631 | 7/1991 |
| WO | WO 9402389 A1 | 2/1994 |
| WO | WO 9429241 A1 | 12/1994 |
| WO | WO 00/12448 | 3/2000 |

OTHER PUBLICATIONS

Moore, et al., The Compost Stack, *The Complete Australian Gardener*, 1982, pp. 694–696, Bay Books Pty., Ltd. Parade, Kensington, NSW Australia 2033; National Library of Australia.
PCT International Search Report; PCT/AU00/01491; Mar. 21, 2001; Australian Patent Office.
Derwent Abstract for Netherlands Pat. Pub. 9200512–A (Vuilafvoer), 1993.
Derwent Abstract for Japan Pat. Pub. 08141542–A, (Matsushita Electric Works, Ltd.), 1994.
Derwent Abstract for Japan Pat. Pub. 09150132–A, (Mitsubishi Materials Corp), 1997.
Derwent Abstract for Japan Pat. Pub. 11128891–A, (Nesuta KK), 1999.
Derwent Abstract for Japan Pat. Pub. 2000117232–A, (Daisho Shoji KK), 2000.

* cited by examiner

*Primary Examiner*—David A. Redding
(74) *Attorney, Agent, or Firm*—Senniger, Powers, Leavitt & Roedel

(57) ABSTRACT

A composting container is disclosed which includes side walls, a base and an opening. The composting container defines an internal space. A platform in the container separates the internal space from a collection chamber below the platform. An aerator in the container is in conmmunication with the outside air so that air can pass into the aerator and then flow into composting material within the container. Leachate which drains from the composting material is collected in the collection chamber below the platform. The aerator may be formed from wire mesh or from modular units which stack one above the other. Underside projections have apertures to enable air to flow out of the aerator into the composting material.

25 Claims, 3 Drawing Sheets

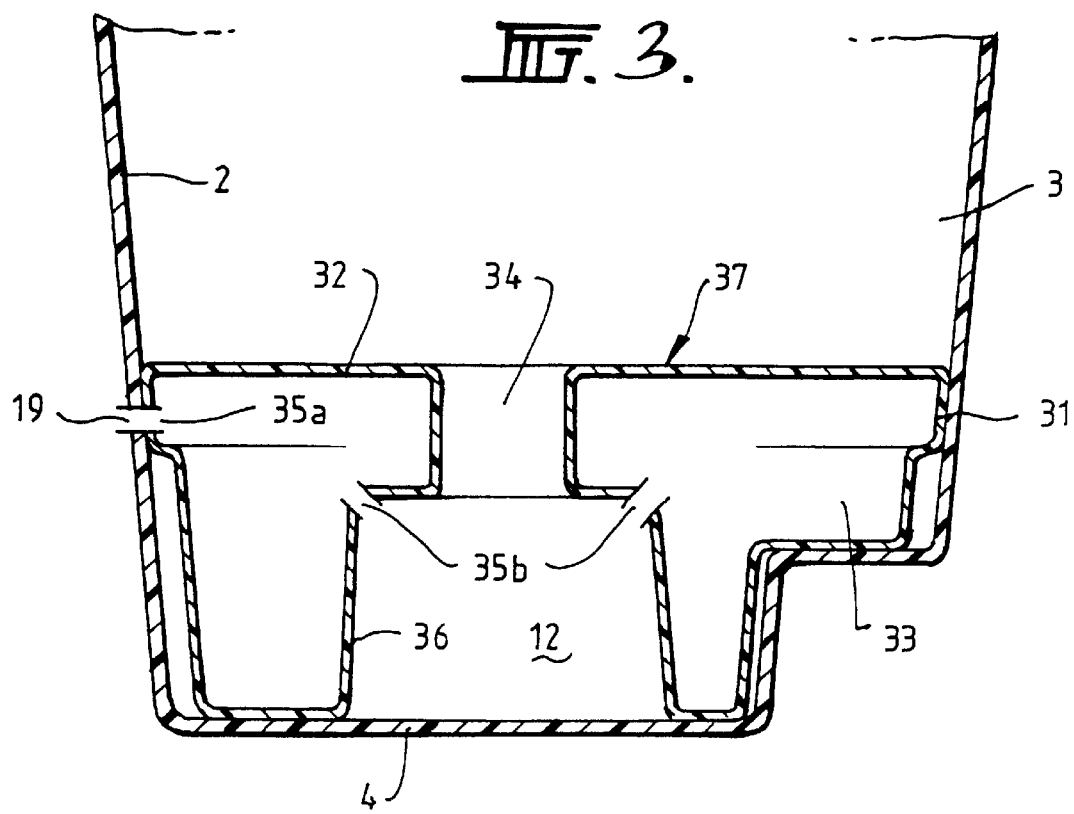
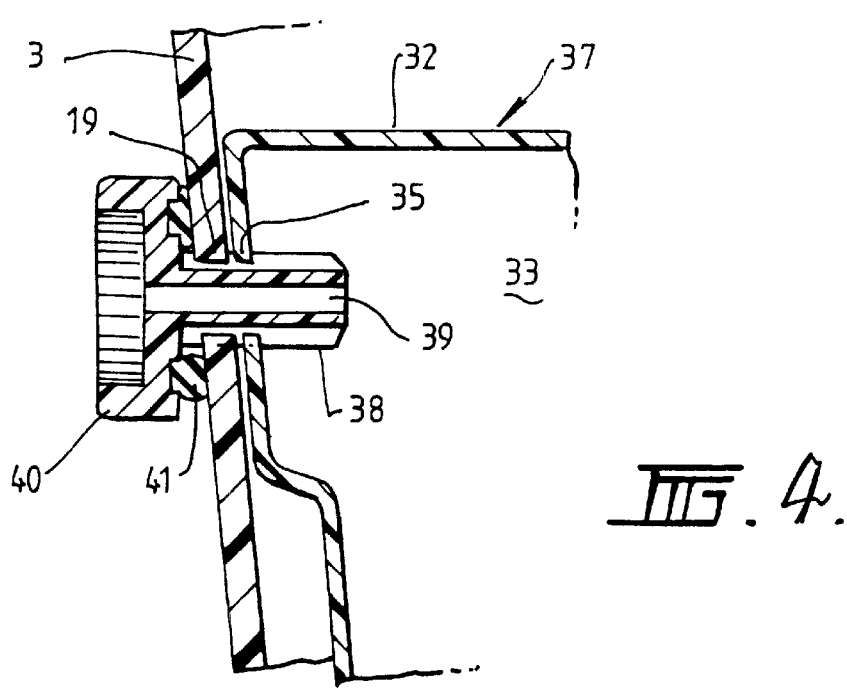

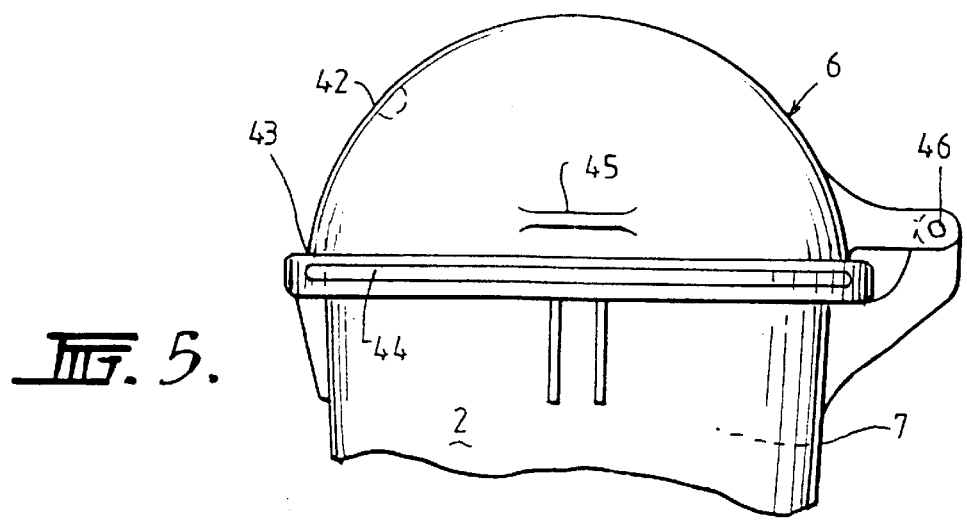
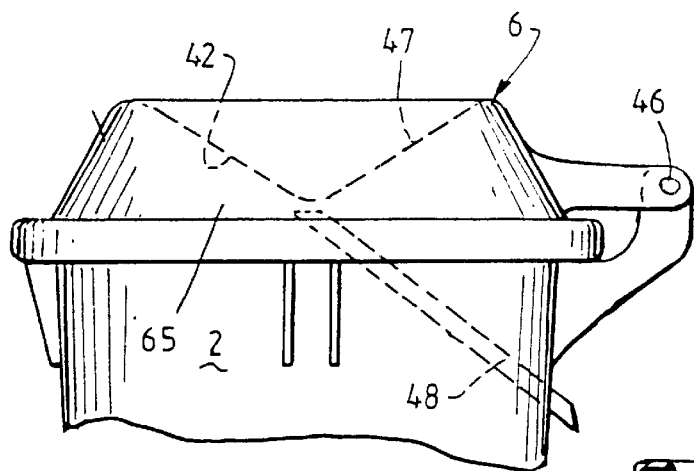
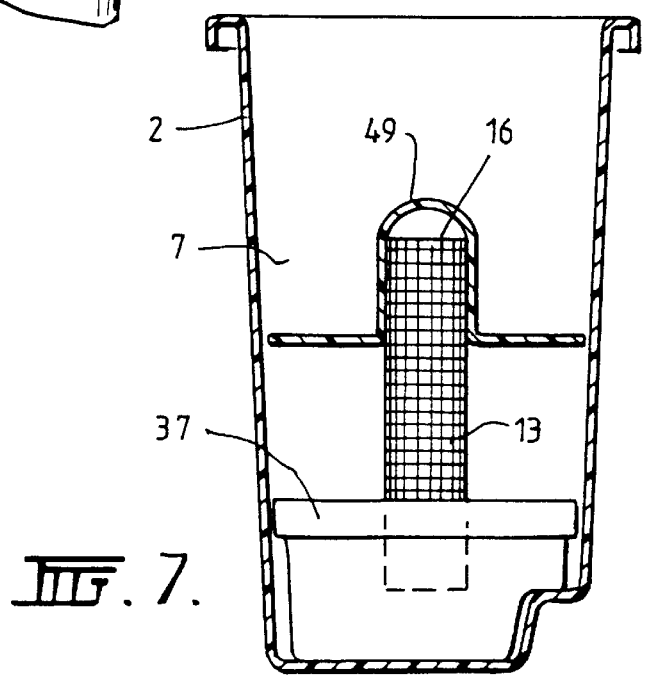

COMPOSTING DEVICE

BACKGROUND OF THE INVENTION

The present invention is directed to a composting device and an aerator for use in a receptacle for composting material.

It is becoming a common practice for households to recycle domestic rubbish. One method of recycling is to place organic material, such as food scraps and vegetative matter, in a compost bin, allow the material to decompose and then use the composted material as a fertilizer. A typical compost bin has rigid side walls, an open bottom and top. The bin is placed on the ground so that the ground forms the base of the container. A closure is often provided for the opening.

Unfortunately, the rate of decomposition of material placed in such a bin can be slow as the supply of air to the composting material is often inadequate, especially if the opening to the container is closed with the lid. A free flow of oxygen is essential to support aerobic activity by composting bacteria.

A by-product of decomposition is a fluid called leachate. The present applicant has recognised that 9 this fluid remains in the composting material during the composting process it can interfere with the composting process as it can slow the flow of oxygen in the material. In the type of bins mentioned above it is not possible to easily separate the leachate from the decomposing material, and this is a further difficulty with such bins.

The present application seeks to overcome or ameliorate these problems

BRIEF SUMMARY OF THE INVENTION

According to a first aspect, the present invention is directed to a composting device including:
- a receptacle having an opening and an internal space;
- load supporting means located inside said receptacle to support material placed therein away from the lower end of the receptacle and to define a fluid collection chamber at said lower end, said fluid collection chamber being in fluid communication with a portion of the internal space above the load supporting means;
- one or more aerators located within said receptacle, each aerator having a body having an internal air chamber and one or more apertures to permit air in said air chamber to pass out through said aerator and into said receptacle; and
- an air inlet opening into said receptacle and in gaseous communication with said aerator to permit air outside said receptacle to enter said aerator.

The receptacle may be a simple bag. Alternatively, it may be a container having a base, rigid walls and a closure for the opening of the container. A type of container useful in this invention has a pair of wheels located at its lower end and a handle at its upper end so that the container can be tipped onto its wheels and moved around.

Such a wheel container is commonly referred to as a "wheelie bin".

Preferably, the load supporting means has an opening and the aerator connects with said opening. For example, the lower end of the aerator may extend into the opening so that there is a contact fit between these two structures.

In this manner the load supporting means also functions to hold the aerator in position, which is preferably in the centre of the receptacle. Where the lower end of the aerator extends through an opening in the load supporting means, a locking nut may be fitted to the lower end to secure the aerator in place.

The lower end of the aerator may have an opening to the internal air chamber aerator. It is also preferably that the upper end of the aerator is closed so as to prevent the entry of composting material into the aerator. However, one or more apertures may be located in the upper end to allow airflow through the upper end.

Preferably the aerator has an elongate shape and is located so that it extends upwards through the centre of the receptacle. It is preferred that the aerator in the receptacle be completely covered by decomposing material so as to minimise heat loss through the aerator. Where the aerator takes the form of a column extending up through the receptacle, and there is insufficient material in the receptacle to completely cover this column, an upper pad of the column, an upper part of the column will be exposed. Accordingly, in a preferred embodiment there is provided a cap for fitting over the upper end of the aerator to minimise the flow of air through the upper end of the aerator.

When the material in the receptacle starts to decompose, heat is generated. The heat causes convection currents in the aerator, which assists in drawing air from outside the receptacle and into the aerator.

In one embodiment a mesh material, such as wire mesh, is used to form the aerator.

In another embodiment, the aerator is formed from one or more interconnecting units, each unit including:
- an upper end, a lower end, an internal air chamber and an opening at each upper and lower ends to said air chamber;
- one or more projections extending outward from a side of said unit for contacting material failing onto said unit; and
- one or more apertures to permit air inside said air chamber to pass through said aerator.

In another aspect, the present invention is directed to such an aerator per se for use in a composting device.

The one or more projections contact compost material falling onto said unit to minimise the build-up of this material around the unit,. Preferably these projections are angled so that they extend downward and outward from the unit and thereby act to deflect material away from the unit. In a further preferred embodiment these deflecting projections are located at or adjacent the upper end of the unit. There may be present only one such angled projection on each unit, which extends around the unit to form a collar. Alternatively, a series of arms may be located around the unit, each arm extending downwardly and outwardly from the upper end of the unit to provide a number of angled surfaces. The arms may form a star or cross pattern when viewed from above. Three to six arms are preferably present. Preferably, the angled surface or surfaces extend to 50 to 100 mm out from the side of the unit.

The outwardly extending projections assist in minimising the compaction of material around each unit as an air gap may form below each projection.

It is preferred that the one or more apertures are located beneath the outwardly extending projections so as to minimise the possibility that downwardly failing material enters the aerator through the apertures. For example, the apertures may be located in the side of the body of the unit. Alternatively, the apertures may be located in the underside of each projection.

The interconnecting units are preferably shaped so that the lower end of one unit can be placed in the upper end of an adjacent unit to provide a contact fit. In this manner, a number of units may be fitted together to form a vertical column. This vertical column will have a series of outwardly extending projections and apertures evenly spaced along its length. This allows a good flow of air into the composting material at appropriate points to optimise aerobic composting and minimises the compaction of composting material.

It is preferred that decomposing material in the receptacle not be able to enter the aerator. Accordingly, where the aerator is formed from interconnecting units as described above, a closure may be provided to close the upper end of the uppermost interconnecting unit. Alternatively, the uppermost unit may differ from the lower units by having an upper end that is closed.

Preferably, the interconnecting units are made from plastics material.

The load supporting. means may be a plate. The surface of the plate may be flat or slightly curved so that leachate from decomposing material that contacts the surface is directed to the perimeter of the plate and then to the fluid collection chamber below. One or more support members may be provided to hold the plate in an elevated position. The function of the plate is to form a platform in the receptacle and create a fluid collection area below. This can be achieved by a load supporting means having different configurations. For example, in another embodiment the load supporting means has a hollow body having an upper surface that forms a platform. Again, support members may be provided. The body and support members may be integral unit. Apertures may be located in the hollow body to allow air flow from outside the receptacle to enter the body and then enter the aerator. In this way the hollow body acts as a bladder.

Retainers may be provided to hold the hollow body in place. Each retainer may be a pin for placement through the air inlet in the receptacle and through an aligned aperture in the hollow body. Preferably, the pin has a bore extending through it to provide an air passage from the air inlet into the hollow body.

It is considered that the combination of load supporting means and aerator is novel in itself. Accordingly, in another aspect, the present invention is directed to a combination of a load supporting means and aerator for placement in a composting receptacle having an internal space, said load supporting means having an upper platform and supports to locate said upper platform in an elevated position and to create a fluid collection area below said platform, said aerator having a body having an internal air chamber and one or more apertures to permit air in said chamber to pass out through said aerator.

The load supporting means and aerator of this aspect may have one or more of the preferred features as described above.

The chamber at the base of the receptacle collects leachate from the decomposing material located above. Leachate is a valuable by-product of the decomposing process and it is therefore advantageous to separate it from composting material for use as a liquid fertilizer. Furthermore, liquid in the lower strata of the decomposing matter can occlude oxygen and turn aerobic decomposition into anaerobic decomposition. For this reason as well, it is desirable to remove the leachate from the body of the decomposing material.

Accordingly, it is preferable to provide an outlet in the fluid collection chamber so that the leachate can be drained. It is also preferable to provide an indicating means to show the level of fluid present in the chamber. This indicating means may be a transparent tube connected to the outlet which, when upturned, acts as a sight glass.

As noted above, the fluid collection chamber is in fluid communication with a portion of the internal space above the load supporting means. This may be achieved by providing apertures in the load supporting means or providing a small gap between the load supporting means and the sides of the receptacle to allow leachate to drain into the fluid collection chamber. It is preferable that the entry of decomposing material into the fluid collection chamber be prevented. This may be achieved by providing apertures of a small diameter or providing a filter over the apertures.

The aerator is in gaseous communication with the air inlet in the receptacle. In one embodiment, an air supply tube may be provided, said tube extending from the air inlet to the aerator. It is further preferred that the tube is made of a rigid material and is located immediately above the load supporting means to assist in holding the load supporting means in position in the lower end of the receptacle.

Where the receptacle is a container having rigid side walls, it is preferably that a bag also be provided to line the inside of the container. The bag performs a number of functions. Firstly, the bag assists in insulating the decomposing material placed in the container. Maintaining the correct temperature in the interior of the container is important to ensure optimum decomposition. The second function of the bag is that it assists in the emptying of the contents of the container. In one embodiment the bag lines the side walls of the container and the bottom of the bag rests on the load supporting means. An opening may be provided in the bottom of the bag through which the aerator extends, Minor apertures may also be provided in the bag to allow leachate to drain from the decomposing material and into the fluid collection chamber below.

To empty the contents of the container, the bag enclosing the decomposing material is simply lifted out of the container. This may be facilitated by attaching handles to the top of the bag.

The material at the bottom of the bag will be in the most advanced state of decomposition. Accordingly, once the bag is removed from the container, it is preferable to invert the bag and remove the material from the bottom of the bag. Where the bag has an opening in its lower end for the aerator to extend through, access to this material may be gained through this opening. It is preferable that the opening be closable. It is also preferable that the opening at the top of the bag is closable to prevent material failing out when the bag is inverted. For example, a drawstring may be provided to close this opening. Alternatively, a flap may be provided around the opening which is folded down when the bag is in use in the container. Prior to lifting the bag out of the container the flap is folded over the opening to close the opening.

When the bag is removed and inverted, it may be preferable to also remove the aerator from the container so that it remains inside the bag. Even when inverted, the aerator should still function to provide air flow to the interior of the bag. Accordingly, the decomposition process can continue in the inverted bag.

Where the receptacle is a container it is preferable that the container has a closure for the opening. This prevents vermin infesting the container and reduces odour escaping from the decomposing material in the container. The closure also minimises heat loss.

Under normal circumstances the generation of heat from decomposing green organic material in a composting container causes gasses to rise and carry moisture through the material. The rising moisture condenses on the closure and in the case of closures found in typical composting bins which are substantially flat, drips back onto the surface of the decomposing material below. This may block the escape of gases and cut off the air flow through the container and consequently kill off aerobic bacterial activity. Furthermore, condensate that drips back onto the composting mass can cool down the mass. It has been realised that decomposition can be improved if the closure is shaped to minimise this return of condensate.

Accordingly, in a preferred embodiment, the container according to this invention has a closure which is configured so that condensate that collects on the underside of the closure is directed to an area external to and/or separated from the internal space of the container thereby minimising return of the condensate to the internal space.

In one embodiment at least part of the underside of the closure slopes towards the perimeter of the closure so that the condensate runs off to the perimeter. For example, part of the underside may have a concave shape. Alternatively, the entire closure can have a dome shape.

It is further preferred that the perimeter of the closure extends beyond the opening of the container when the closure is in place to close the opening. If a rim is present around the opening of the container, this will assist in preventing condensate that collects at the perimeter from entering the interior of the container. A condensate collecting means, such as a channel, may also be provided.

In an alternative embodiment, the underside of the closure has a convex shape. Condensate on the underside runs to the apex of the convex shape and drops onto a condensate collecting means below. This collecting means defines the area separated from the internal space of the container and may be a channel that extends to the exterior of the container. The convex shape may be formed by depression in the upper side of the closure. This depression can also be utilised to collect rainwater. In this case a spout may be provided at the rear of the lid so that when tilted, water in the depression is drained off through the spout and into a separate container. Alternatively, the depression in the lid can be used to hold soil, compost etc.

A further advantage of such closures is that condensate that is removed from the container can be collected and reused for irrigation or other purposes.

Preferably, the closure is hingedly attached to the bin by hinging pins, for example, and is removable from the bin.

In further preferred embodiments the closure has a handle to assist the user to open and close the closure and also to assist in carrying the closure when separated from the container. The closure may incorporate aeration holes to assist in airflow. These holes could be 0.5 to 1.5 mm in diameter and up to five such holes may be provided. These holes prevent build up of dangerous gasses such as methane, in the compost container.

A number of components of the composting device of this invention can be formed from a plastics material which is UV stabilised. Such components include the aerator, load supporting means, retainer and closure. Suitable plastics material base polymer-polypropylene, high density polyethylene or low density polyethylene. The components may be manufactured via injection moulding, blow moulding, rotational moulding, vacuum moulding or fabrication and welding of the plastic material.

Where the receptacle is a container having rigid side wall, it is preferred to provide access in one of these side walls to the interior of the container so that decomposing material can be removed from the container. Preferably, this access is located towards the lower end of the container and above the load supporting means as material in the most advanced state of decomposition will be located in this area of the container. The access may be an opening in the side wall of the container which is closed by a cover such as a hinged flap. It is desirable that this hinged flap seals the opening when closed so as to avoid leakage through the opening.

Decomposing material in the receptacle can be an attractive breeding site for insects. Thus, it is desirable to prevent the entry of insects into the receptacle and this can be achieved by providing filters over all air inlets to the receptacle. Furthermore, an insecticide may be provided in the receptacle to kill any insects that find their way into the interior. Where the receptacle is a container having a closure, a suitable location for the insecticide is the underside of the closure.

BRIEF DESCRIPTION OF THE DRAWINGS

The invention shall now be described with reference to the following figures which illustrate preferred embodiments of the invention.

FIG. 3 is a schematic representation of the lower end of a composting device according to this invention showing details of a load supporting means.

FIG. 4 is a schematic representation of a retainer.

FIGS. 5 and 6 are schematic representations of closures.

FIG. 7 is a schematic representation of a composting device of this invention showing details of a cap.

DETAILED DESCRIPTION

Figure 1:
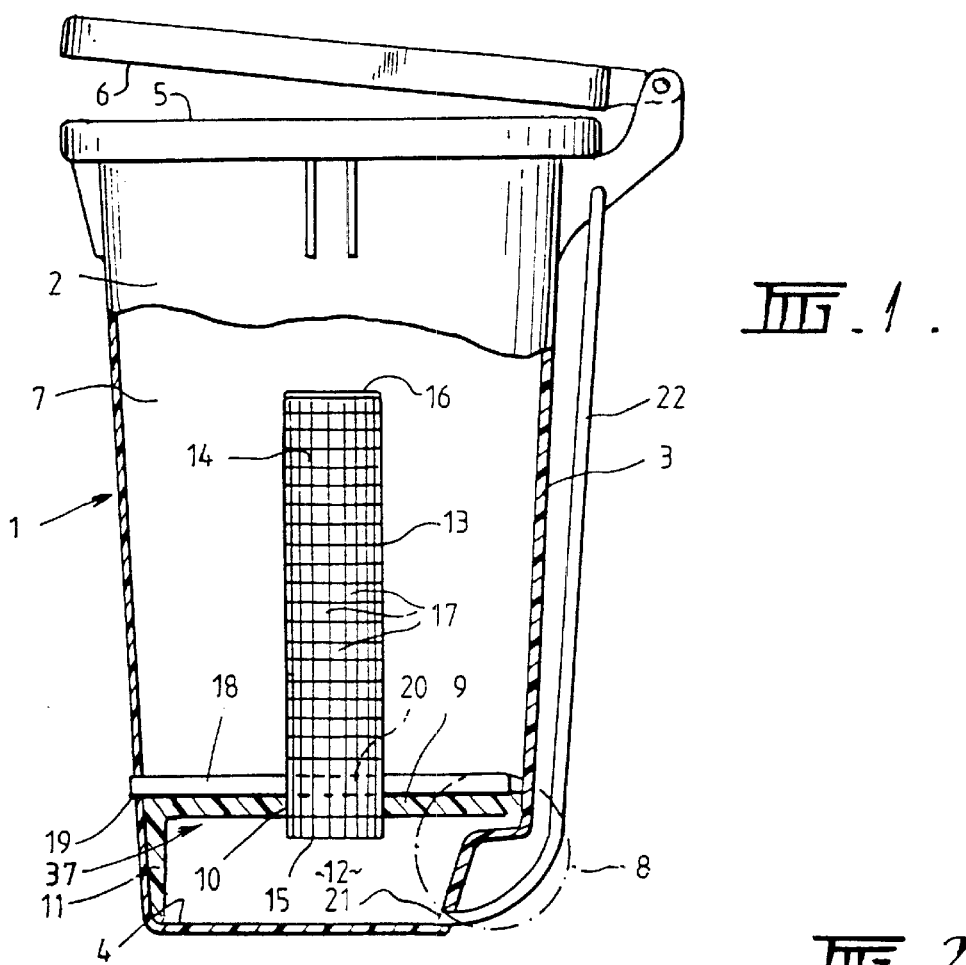
FIG. 1 is a schematic representation of a composting device of this invention.

Turning to FIG. 1, the composting device 1 includes a container 2 having rigid side walls 3, a base 4, an opening 5, hinged closure 6 and internal space 7. The container also has wheels 8 shown in a dotted line. The container 2 is also the type commonly referred to as a "wheelie bin". The bins may be an 80L, 120L, 140L, or 240L capacity. Located at the lower end of the container 2 is a load supporting means 37 (broadly "barrier") which is formed by a plate 9 having a central aperture 10 (broadly "connection opening") and side supports 11 to hold the plate 9 above the base 4. A fluid collection chamber 12 forms below plate 9. Located centrally in bin 2 is aerator 13. Aerator 13 is a column-like structure having an internal air chamber 14 lower end 15 having an opening to the internal air chamber and upper end 16. The aerator 13 is formed by a wire mesh material and there is a multitude of apertures 17 along the length of aerator 13 and in the upper end 16. An air supply tube 18 extends from an air inlet 19 in side wall 3, through the aerator 13 and across the width of the container 2. An aperture 20 is located in air supply tube 18 where it passes through aerator 13. Container 2 has a fluid outlet 21 at its lower end and connected to fluid outlet 21 is clear plastic tube 22.

Lower end 15 of aerator 13 extends through aperture 10 in plate 9 and accordingly, plate 9 also assists in holding aerator 13 in position. Air supply tube 18 is a rigid tube which passes above plate 9 and through aerator 13. Accordingly, air supply tube 18 also functions to hold plate 9 and aerator 13 in place.

In use, material for composting is placed in internal space 7 around the aerator 13 so that it completely covers aerator 13 in position. Air from outside container 2 can enter the container via air inlet 19, pass through air supply 18 an aperture 20 and enter air chamber 14 of aerator 13. Air can then pass through apertures 17 in aerator 13 into the centre of the mass of material. In this way, a good supply of air is provided to the material. As the material starts to decompose heat is generated causing convention currents to aerator 13. These currents draw air into the aerator through the air supply tube 18. Plate 9 holds the decomposing material above the base 4 of the container 2. It should be noted that plate 9 does not extend the complete width of the container 2 and there are small gaps between the side wall 3 and the edge of the plate 9. This allows fluid or leachate from the decomposing material to pass into the fluid collection chamber 12. The level of fluid in chamber 12 can be seen through clear tube 22 which acts as a sight glass. When fluid is to be removed from the fluid collection chamber 12, the end of tube 22 is lowered to allow leachate to drain from the chamber 12.

Figure 2:
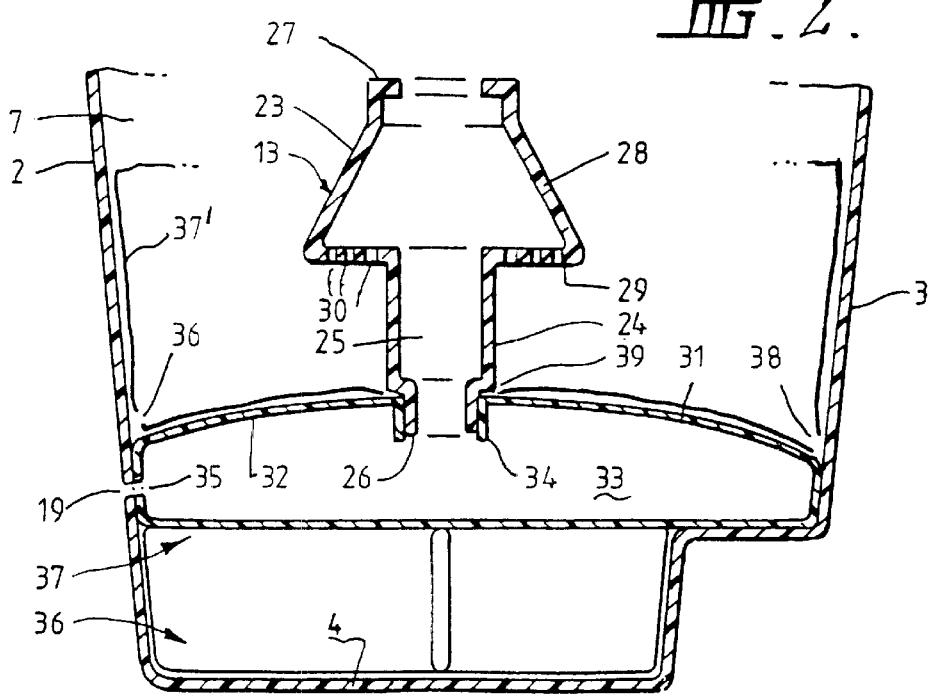
FIG. 2 is a schematic representation of the lower end of a composting device according to this invention showing details of an aerator and load supporting means.

FIG. 2 is a schematic representation of the lower end of the container 2 showing details of an aerator and load support means according to another embodiment of this invention. In this embodiment, the aerator 13 is formed by a number of modular units 23 which can be stacked one on top of the other to form a column-like structure. In FIG. 2, only one modular unit 23 is shown. Modular unit 23 has a body 24 having internal chamber 25, lower end 26 and upper end 27. The lower and upper ends 26 and 27 are open-to internal chamber 25. Located towards the upper end 27 is deflecting surface 28. In this embodiment the deflecting surface 28 is a collar that extends around the body 24 of the unit 23. In other embodiments the unit 23 may have a number of deflecting surfaces formed by two or more arms which extend downward from upper end 27 and outward from body 24. The lower end of each such arm may extend 50–100 mm outwards from the side of the body 24. The collar 28 has an underside 29 and in this underside there are located a series of apertures 30. Each aperture may be about 4 mm in width. Where the deflecting surface is formed by a series of arms, there may be 1–3 such apertures located in the underside of each arm. The lower and upper ends 26 and 27 of unit 23 are shaped so that the lower end 26 of one unit 23 can fit in the opening of an upper end 27 of an adjacent unit 23.

The load supporting means 37 is formed by a body 31 having an upper platform 32 and an internal cavity 33. A central opening 34 is located in the platform 32. The lower end 26 of one modular unit 23 extends into opening 34 and is thereby supported in the container 2. In body 31 there is also located an air inlet 35. Support means 36 hold the body 31 above a base 4 of container 2. In this embodiment the support means 36 is a set of cross-shaped legs which is separate from body 31. In other embodiments the body 31 and legs 36 could be an integral unit.

A lining bag 37 is located in the container 2 around the side walls 3 and across the platform 32. At the edges of the lining bag 37 there are located apertures 38. The lining bag 37 has a central opening 39 through which aerator 13 extends.

In use, air may enter the hollow body 31 through air inlet 19 and aperture 35. Hollow body 31 acts as a bladder and air can pass through opening 34 into the cavity 25 of modular unit 23. The air can then pass into space 7 through apertures 30 located in the underside 29 of modular unit 23. Sloping collar 28 acts to deflect material failing downwards onto unit 23 away from the lower end 26. Thus, an air pocket forms around the lower end 26 so that air may easily pass from internal cavity 25 through apertures 30. As a number of units 23 are interconnected to form a vertical column, a series of deflecting surfaces 28 and apertures 30 will be located at regular intervals along the length of the column. This ensures a good airflow through the aerator 13 into the space 7 and also minimises compaction of composting material.

A lining bag 37 is provided so that when the contents of the container 2 are to be emptied, the lining bag can be lifted out of the container. In this embodiment, the modular units 23 which extend through the central opening 39 in the lining bag 37 can also be removed with the lining bag 37. Draining apertures 38 are located in lining bag 37. When fluid contacts the lower end of the lining bag 37, it is directed towards apertures 38 by sloping platform 32. There is a space between the side walls 3 and body 31 to allow fluid to pass the body 31 and enter the fluid collection chamber 12.

FIG. 3 is schematic representation of the lower end of a container 2 according to this invention showing details of a load supporting means according to another embodiment. In this embodiment the load supporting 37 means is formed by a body 31 which is integral with supports 36. The body has an upper platform 32 and an internal chamber 33 which acts as an air bladder. A centre aperture 34 is located in the body 31. Air may pass through air inlet 19 and aperture 35a and into internal cavity 33. The air may then exit cavity 33 through aperture 35b and pass through centre opening 34 to an aerator (not shown) which extends into-centre opening 34. In this embodiment supports 36 extend around the fluid collection chamber 12.

FIG. 4 is a schematic representation of a retainer for use in the present invention. In this figure, part only of the container 2 and load supporting means 37 is shown. The air inlet 19 aligns with aperture 35 in load supporting means 37. To hold load supporting means 37 in place there is provided a retainer 38. Retainer 38 is a locking pin which extends through air inlet 19 and aperture 35. A passage 39 extends through retainer 38 so that air may pass through the retainer 38 and into the cavity 33 of load supporting means 37. Preferably a fine mesh material is located across the passage 39 to act as a filter. The outer end of 38 has enlarged head 40 to assist in inserting and removing the retainer 38. 0 ring seal 41 also provided to provide an air tight seal.

FIG. 5 is a schematic representation of a closure 6 for use with a container 2 of this invention. The closure 6 has a domed shape so that the underside 42 of closure 6 is concave. Accordingly, condensate that collects on the underside 42 runs to the perimeter 43 and to a condensate collection channel 42 in the rim of container 2 and thus, does not return to the interior 7 of container 2. Closure 6 is hingedly attached to container 2 by hinge pin 46. The pin 46 can be removed so that the closure 6 can be removed. When inverted closure 6 can act as a carrying device. Closure 6 also has handles 45 to assist in pivoting the closure 6.

FIG. 6 shows a closure 6 according to another embodiment of this invention. In this embodiment, a depression 47 is formed in closure 6 so that a portion of underside 42 has a convex shape. Condensate that collects on the underside 42 runs to the apex of the convex shape and then drops onto a collection channel 48 and thereby exits the container 2 The depression 47 can also act as a rainwater collection area.

In this embodiment, the lid 65 is also detachable from container 2 so that it can be used as a carry device.

FIG. 7 is a schematic representation of part of the composting device 1 of this invention showing details of an end cap. In this figure the aerator 13 supported by load supporting means 37 extends through the centre of container 2. If material to be decomposed is placed in the internal space 7 of container 2 but does not cover the upper end 16 of aerator 13, there may be a loss of heat through the upper end 16. It is desirable to prevent this heat loss. This is achieved by placing an end cap 49 over the end 16 of aerator 13.

It should be appreciated that various modification may be made to the composting device and aerator as described in this application without departing from the spirit of the invention.

What is claimed is:

1. A composting device comprising:
   a receptacle having an opening and an internal space;
   a barrier in said internal space to divide the internal space into an upper composting chamber and a lower fluid collection chamber, the barrier being for supporting composting material in the composting chamber so the composting material is retained in the composting chamber and does not fall into or collect in the fluid collection chamber;
   a fluid passage for allowing fluid in the composting chamber to drain into the fluid collection chamber, whereby fluid is removed from the composting material when deposited in the upper composting chamber to improve aerobic decomposition of the composting material in the composting chamber;
   one or more aerators located within said composting chamber, each aerator having a body having an internal air chamber and one or more apertures to permit air in said air chamber to pass out through said aerator and into said composting chamber; and
   an air inlet opening into said receptacle and in gaseous communication with said aerator to permit air outside said receptacle to enter said aerator.

2. A composting device according to claim 1 wherein said barrier has a connection opening and said aerator connects with said connection opening.

3. A composting device according to claim 2 wherein a lower end of said aerator has an aerator opening connected to said internal air chamber.

4. A composting device according to claim 3 wherein the barrier comprises a hollow body having an upper surface forming a platform in said receptacle and one or more support members to hold said body above a lower wall of the receptacle, and wherein the fluid collection chamber is defined between the platform and the lower wall.

5. A composting device according to claim 1 wherein the aerator has an open bottom and a closed top.

6. A composting device according to claim 5 wherein one or more apertures are located in the closed top.

7. A composting device according to claim 1 having an outlet located at a lower end of the receptacle and connecting with the fluid collection chamber to emit fluid located in the collection chamber to drain from the receptacle.

8. A composting device according to claim 7 having indicating means to show the level of fluid present in said fluid collection chamber.

9. A composting device according to claim 8 wherein said indicating means includes a transparent tube connected to said outlet.

10. A composting device according to claim 1 wherein said receptacle is a bag.

11. composting device according to claim 1 wherein said receptacle is a container having rigid side walls, a base and a closure for said opening.

12. A composting device according to claim 1 wherein a closure is provided for closing said receptacle opening, the closure being configured so that condensate that collects on the underside of the closure is directed to an area external to and/or separated from the composting chamber, thereby minimizing return of the condensate to the composting chamber.

13. A composting device according to claim 12 wherein said closure is a domed shaped lid.

14. A composting device according to claim 1 wherein the fluid passage comprises a gap between the barrier and a side wall defining the receptacle.

15. A composting device including:
    a receptacle having an opening and an internal space;
    a load supporting means located inside said receptacle to support material placed therein away from the lower end of the receptacle and to define a fluid collection chamber at said lower end, said fluid collection chamber being in fluid communication with a portion of the internal space above the load supporting means;
    one or more aerators located within said receptacle, each aerator having a body having an internal air chamber and one or more apertures to permit air in said air chamber to pass out through said aerator and into said receptacle;
    an air inlet opening into said receptacle and in gaseous communication with said aerator to permit air outside said receptacle to enter said aerator;
    wherein said load supporting means has an opening and said aerator connects with said opening;
    wherein a lower end of said aerator has an opening to said internal air chamber; and,
    wherein said load supporting means includes a hollow body having an upper surface forming a platform in said receptacle and one or more support members to hold said body above the lower end of the receptacle.

16. A composting device according to claim 15 wherein said receptacle is a container having rigid side walls, a base and a closure for said opening.

17. A composting device according to claim 16 wherein said closure is configured so that condensate that collects on the underside of the closure is directed to an area external to and/or separated from the internal space of the container thereby minimizing return of the condensate to the internal space.

18. A composting device including:
    a receptacle having an opening and an internal space;
    a load supporting means located inside said receptacle to support material placed therein away from the lower end of the receptacle and to define a fluid collection chamber at said lower end, said fluid collection chamber being in fluid communication with a portion of the internal space above the load supporting means;
    one or more aerators located within said receptacle, each aerator having a body having an internal air chamber and one or more apertures to permit air in said air chamber to pass out through said aerator and into said receptacle;
    an air inlet opening into said receptacle and in gaseous communication with said aerator to permit air outside said receptacle to enter said aerator; and
    wherein the aerator has an open bottom and a closed top.

19. A composting device according to claim 18 wherein said load supporting means has an opening and said aerator connects with said opening.

20. A composting device according to claim 18 having an outlet located at the lower end of the receptacle and connecting with said fluid collection chamber to permit fluid located therein to drain from said receptacle.

21. A composting device including:

a receptacle having an opening and an internal space;

a load supporting means located inside said receptacle to support material placed therein away from the lower end of the receptacle and to define a fluid collection chamber at said lower end, said fluid collection chamber being in fluid communication with a portion of the internal space above the load supporting means;

one or more aerators located within said receptacle, each aerator having a body having an internal air chamber and one or more apertures to permit air in said air chamber to pass out through said aerator and into said receptacle;

an air inlet opening into said receptacle and in gaseous communication with said aerator to permit air outside said receptacle to enter said aerator;

an outlet located at the lower end of the receptacle and connecting with said fluid collection chamber to permit fluid located therein to drain from said receptacle and indicating means to show the level of fluid present in said fluid collection chamber.

22. A composting device according to claim 21 herein said load supporting means has an opening and said aerator connects with said opening.

23. A composting device according to claim 22 wherein a lower end of said aerator has an opening to said internal air chamber.

24. A composting device according to claim 21 wherein said receptacle is a container having rigid side walls, a base and a closure for said opening.

25. A composting device according to claim 24 wherein said closure is configured so that condensate that collects on the underside of the closure is directed to an area external to and/or separated from the internal space of the container thereby minimizing return of the condensate to the internal space.

* * * * *